INVENTOR
SPRAYA SHACHAR

BY [signature]

ATTORNEY

INVENTOR

SPRAYA SHACHAR 3,372,691
METHOD AND SYSTEM FOR MAINTAINING A VERTICALLY VARYING CONCENTRATION IN A LIQUID SOLUTION AND FOR CONVERTING BODIES OF WATER INTO EFFICIENT SOLAR COLLECTORS
Spraya Shachar, 15 Sderot Ben-Zion, Tel Aviv, Israel
Filed Aug. 2, 1965, Ser. No. 476,416
18 Claims. (Cl. 126—271)

ABSTRACT OF THE DISCLOSURE

A method and system are described for maintaining an inverse temperature gradient between an upper and a lower level in a liquid column, for example, a solar pond of saline water in which the pond has a dark layer to absorb radiations from the sun applied through the upper layer. A vertically varying concentration of the salt in the solar pond sufficient to support the inverse temperature gradient is maintained by inducing a downward flow of the saline water counter to the diffusion flux of the salt. This counter flow is induced by extracting, from the lower level, water having a smaller concentration of salt then at the upper level, both being regulated at rates so as to maintain the vertically varying concentration while avoiding excessive mixing.

---

Figure 1:
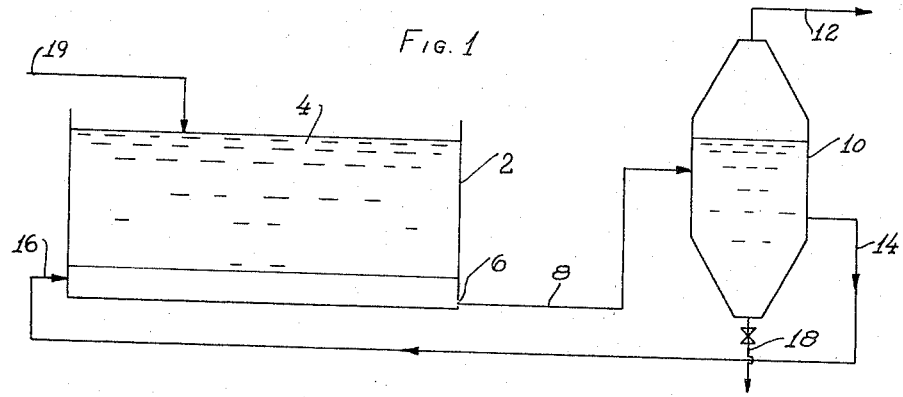

The present invention relates to a method and system for maintaining a vertically varying concentration in a liquid solution and for converting bodies of water into efficient solar collectors. The invention is hereafter described particularly with respect to the latter application, i.e. solar collectors or solar ponds, as this application represents the one which at the present time appears to have the greatest potential commercial importance.

Generally, there is no difficulty in creating and maintaining a considerable temperature gradient in liquids when they are being heated at the surface. The heated upper layer expands and its density is reduced so that it remains at the top. In the absence of mixing, the heat-transfer to the lower layers is therefore by means of conduction only. In a liquid of low conduction, a considerable temperature gradient can thus be created.

However, if the liquid is heated from below, the lower layer will expand and, because of its reduced density, will rise to the top starting the well-known convection currents. As a result, the temperature throughout the liquid will be substantially equalized. Ordinarily, therefore, an inverse temperature gradient (i.e. a temperature increasing with depth) cannot be created in a liquid column because of convection.

If a liquid solution is used where the solute is heavier than the solvent so that its concentration decreases continuously from the bottom toward the top, the density of the solution will also decrease from the bottom toward the top. If this solution is now heated from below, an inverse temperature gradient will be created and maintained so long as the reduction in density caused by the higher temperature of the bottom layer is not greater than the increase in density due to the higher concentration; or, more acurately, so long as the resulting density gradient does not reach the point required for the initiation of convection at any level. With a sufficiently large difference in concentration between the top and the bottom of the solution, the obtainable difference in temperature can be large enough for utilization in industrial processes. For example, in an experiment with an aqueous solution of magnesium chloride 100 cm. in depth, nearly saturated at the bottom (the density being 1.3 at 27° C.) and the concentration decreasing linearly down to zero at the top (density 1.0), there has been attained, after heating slowly from below, a temperature above 90° C. at the bottom decreasing to 30° C. at the top.

Although there is no difficulty in filling a container with a solution in which the concentration decreases from bottom to top as required, the maintenance of this varying concentration over a long period of time presents a very serious problem. As a result of molecular diffusion, the difference in concentration between the top and the bottom layers will decrease continuously with time. Thin convective layers will form at both ends, and their thickness will grow, until the whole column of liquid becomes convective and both concentration and temperature are practically the same at all depths. If the concentration gradient is used for maintaining an inverse temperature gradient in a large expanse of water, the situation is much worse, since in addition to the molecular diffusion, there will also be mixing caused by the wind, waves, evaporation, and other factors, all of which will combine in speeding up the destruction of the density gradient and causing the solution to become homogeneous.

The use of a concentration gradient for supporting an inverse temperature gradient in liquids can therefore be of practical significance only if the concentration gradient can be maintained substantially stable for a long period of time. One method proposed for accomplishing this is described in Israel Patent No. 12,561 of May 25, 1959, which deals with the conversion of shallow ponds into large collectors of solar energy known as "solar" ponds. As described there, the gradient is maintained by the continuous or periodic addition of solid solute or concentrated solution to the bottom region of the solar pond and the continuous or periodic addition of fresh water or dilute solution to the surface region of the pond, and draining by overflow some liquid from the surface region of the pond. In other words, this method is characterized by the addition of salt to the bottom of the pond and the washing of salt out at the top with fresh water.

An object of the present invention is to provide a new method and system for maintaining a relatively varying concentration of a solute in a liquid solution, which method and system do not necessarily require the continuous addition of either salt or fresh water.

A further object of the invention is to provide a new method and system for maintaining an inverse temperature gradient between an upper and a lower level in a liquid solution, particularly in a solar pond or solar collector.

A still further object of the invention is to provide a new method for producing a solar pond from a lake or other depression in land which is naturally filled, or which may be artifically filled, with water.

In practicing the invention, there is first prepared in any suitable manner a vertically varying concentration of a solute in a liquid column with the concentration of the solute greatest at one level of the solution and decreasing continuously toward a second level, so that the resulting density of the solution decreases continuously from the lower to the upper of the said two levels. According to the invention, this vertically varying concentration is maintained by inducing a vertical flow of the liquid column counter to the diffusion flux of the solute, the counterflow being induced by extracting from the said one level a solvent having a smaller concentration of solute than at said second level and adding at said second level solvent having a smaller concentration of solute than at said second level. The rates of the mentioned extraction and addition are regulated such as to maintain the required vertically varying concentration while avoiding excessive mixing tending to destroy the same.

It will be understood, with respect to the terminology used above and as it may also be used hereinafter, that the solvent extracted from said one level could have a "zero" concentration of solute, i.e. it could be pure solvent. This also applies with respect to the solvent added at said second level. It will also be understood that the extraction step could be effected in many different manners involving one or more steps, so long as the final and net effect is that as set forth. For example, according to a preferred embodiment the solvent is extracted by withdrawing solution from the said one level, extracting the solvent from the withdrawn solution by evaporation, and returning the remaining solution (which may be mixed with fresh solution) back to the same level. It is also conceivable that the extraction of the solvent from the said one level could be done in some cases by vaporizing solvent at that level and passing it through the solution itself in the form of vapor bubbles to condense at the second level where the addition step is to be performed. Further, where levels are mentioned, this is intended to include not only exactly at, but also in the vicinity of, the mentioned level. Also, where a salt or solute is mentioned, it is of course contemplated that this could include a plurality of salts or solutes.

Preferably, the liquid solution is such that the concentration of the solute also decreases continuously from the lower to the upper of the said two levels. In this application, the counterflow is induced by extracting from the lower level solvent having a smaller concentration of solvent than at the upper level, and adding at the upper level solvent having a smaller concentration of solute than at the upper level.

According to a preferred embodiment of the invention, this method and system are used for maintaining an inverse temperature gradient between an upper and a lower level in a solar pond of saline water in which the solar pond has a dark layer to absorb radiations from the sun applied through the upper level of the pond. In this case, the counterflow is induced by extracting from the lower level water having a smaller concentration of salt than at the upper level, and adding at the upper level water having a smaller concentration of salt than at the upper level. The rates of the extraction and addition are regulated such as to maintain a substantially stable vertically varying concentration while avoiding excessive mixing tending to destroy same. The vertically varying concentration should be sufficient to maintain a substantially stable vertically varying density decreasing continuously from the lower level to the upper level, thus preventing convection currents and maintaining the inverse temperature gradient.

According to a further feature of the invention, there is provided a method of producing a solar pond from a lake or other natural depression in land filled with salt water, comprising establishing a vertically varying concentration of salt in the pond decreasing continuously from the bottom upwardly and introducing a darkened layer at a predetermined depth to constitute a false bottom in the pond, the vertically varying concentration between the darkened layer and the top of the pond being sufficient to support the required inverse temperature gradient between the darkened layer and the top of the pond. The vertically varying concentration is then maintained in the manner described above.

Further features and advantages of the invention will be apparent from the description below.

The invention may take a number of forms, but is herein described below with respect to the accompanying drawings which illustrate, by way of example only, three embodiments of the invention.

Figure 2:
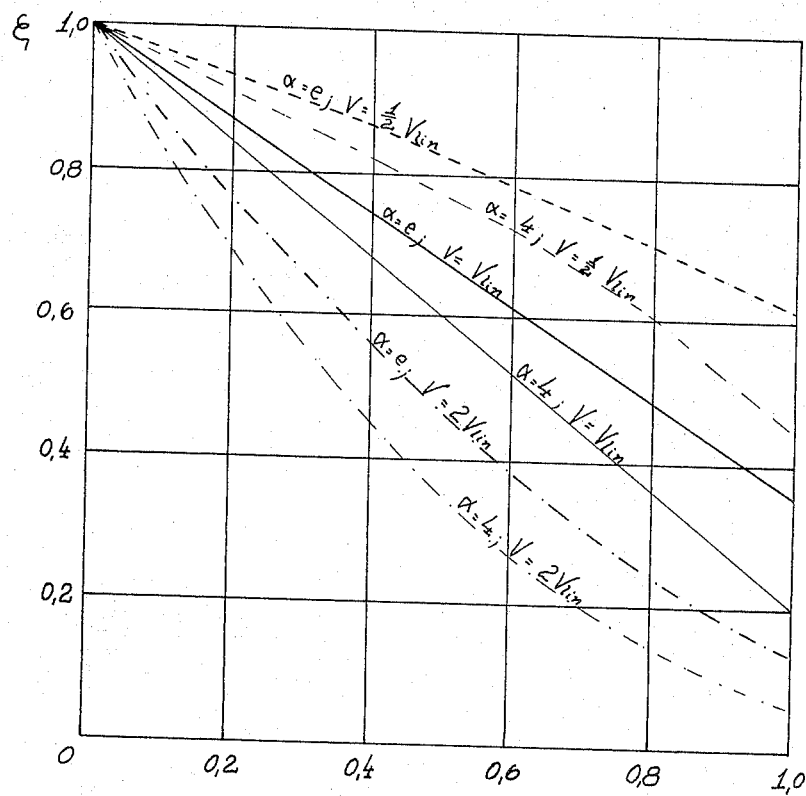
Figure 3:
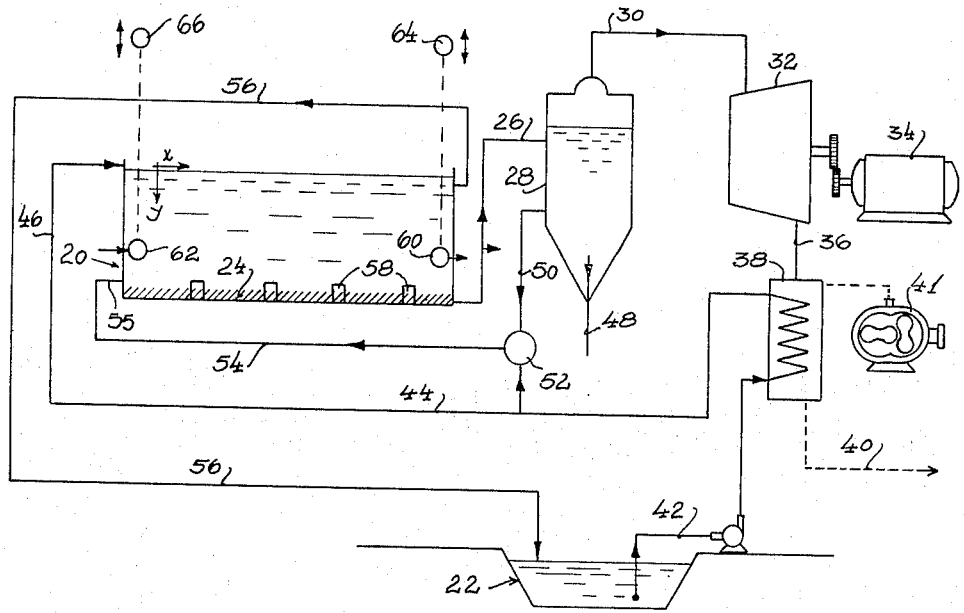
Figure 4:
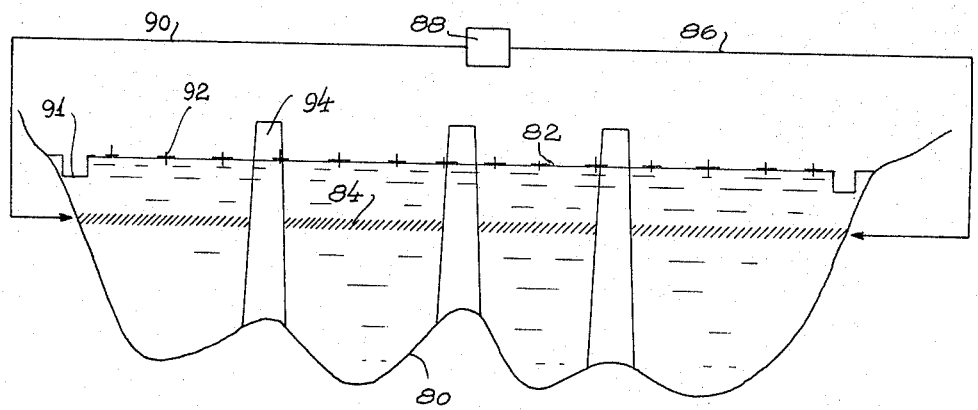

In the drawings:
FIG. 1 is a schematic diagram of a simple system constructed in accordance with the invention;
FIG. 2 is a chart helpful in understanding the basic principles of the invention;
FIG. 3 is a schematic diagram of another system constructed in accordance with the invention to show its use for the production of power, desalinated water, and salt; and FIG. 4 is a schematic diagram of a further embodiment of the invention showing the utilization of natural depressions or existing lakes as solar ponds.

The invention will be better understood by first referring to FIG. 1 which is a simplified schematic diagram illustrating the main principles of the invention.

In FIG. 1, a container 2 is filled with a solution 4 the concentration of which increases with depth as required. The solution is heated slowly from below until the desired temperature of the bottom layer is reached. This temperature is usually referred to as the "operating temperature." For practical uses it should be at least 20° C. higher than the temperature of the upper layer, but in most cases the difference will be considerably greater.

When the operating temperature is reached, the bottom layer is circulated in the following manner: Solution from the bottom layer is withdrawn through outlet 6 at one end of the container near the bottom, and is pumped through a pipe 8 into a flash evaporator 10. Here, a small part of the solvent is evaporated and withdrawn through pipe 12. The remaining solution is cooled and concentrated thereby, and is returned through pipe 14 to an inlet 16 at the bottom of the opposite end of the container. The separated water vapor passing through pipe 12 may be used for power purposes and/or may be condensed and used as desalinated water. Crystallized salt accumulating in the flash evaporator 10 may be removed through duct 18.

This circulation of the bottom layer through outlet 6, evaporator 10, and return inlet 16, produces a slow and steady flow of the bottom layer from the end of inlet 16 toward the end of outlet 6. During this flow over the heated bottom of the container, the temperature of the flowing solution will rise. This circulation with a continuous evaporation of liquid in the flash evaporator 10 will cause the surface level of the solution in the container to fall at the velocity "$u$," which is equal to the quantity of liquid evaporated in the evaporator ($Qe$) divided by the horizontal cross section ($A$) of the container (thus $u = Qe/A$).

For a closed-cycle system, the surface level of the solution in the container could be kept constant by condensing the steam produced in the evaporator 10 with a surface condenser and adding the distilled liquid through pipe 19 to the top of the solution 4 in container 2. Disregarding for the moment possible losses, the surface level of the solution will thus be kept constant, and in addition to the flux of solute from the bottom toward the top of the solution caused by diffusion, there will be produced the steady counterflow, from the top downwardly, of the whole solution in the container. This counterflow will be at the velocity $u$.

Under these conditions, the change in concentration as a function of depth is fixed by the diffusion equation. The condition for steady state in the concentration-depth curve is that the total flux of solute through any horizontal plane be zero, and therefore the diffusion equation will have the form:

$$-uc = D\,dc/dx \quad \text{(Equation 1)}$$

where $c$ is the concentration and $D$ is the molecular diffusion coefficient of the solute at any height $x$ above the bottom of the container. In the method described for purposes of the example, the concentration at the bottom is kept approximately constant (for $x = 0$, $c = c_0$).

For the solution of this equation, we have to know the diffusion coefficient $D$. This coefficient is not constant as it depends on the concentration and temperature. It will therefore also vary with $x$ and will generally be greater at the bottom of the solution where the concentration and temperature are higher, and decrease gradually towards the top as the concentration and temperature are reduced.

From the solution of the foregoing equation, when $D$ is constant and also when $D$ varies linearly with $x$ as explained, it may be concluded as follows:

First, the described method (hereinafter sometimes referred to as the "counterflow stabilization" or "CFS" method) enables the constant existence of a varying concentration decreasing from bottom to top as required:

Secondly, the shape of the steady-state concentration-depth curve depends on the velocity $u$, and can be varied to become convex, linear, or concave by a suitable adjustment of $u$.

Thirdly, the method also enables the maintenance in the solution of an inverse temperature gradient the maximum value of which is fixed by the condition that the resultant density gradient at any level will not reach the point where convection is initiated. The maximum allowable inverse temperature gradient is therefore dependent on the concentration at the bottom of the container and the shape of the concentration curve, which in turn depends on the velocity $u$, both of which can be selected within certain fixed limits. By changing the velocity $u$ during operation, the concentration curve can be modified or corrected, for example when desired to change somewhat the operating characteristics of the solution or to correct deviations caused by external factors.

FIG. 2 illustrates a group of steady-state concentration-depth curves resulting from the solution of the diffusion equation when the diffusion coefficient varies linearly with depth according to the equation:

$$D = D_h\left(1 + \alpha - \frac{\alpha x}{h}\right) \quad \text{(Equation 2)}$$

where:

$$\alpha = \frac{D_o - D_h}{D_h}$$

In the foregoing, $D_h$ is the diffusion coefficient at the surface; $D_o$ is the diffusion coefficient at the bottom; and $h$ is the height of the solution surface above the bottom.

The six curves in FIG. 2 are plotted for the following non-dimensional coordinates:

$$V = \frac{u \cdot h}{D}; \quad \eta \equiv \frac{x}{h}; \quad \xi \equiv \frac{c}{C_o}$$

Each curve represents the steady-state concentration-depth distribution of the solute for the values of $\alpha$ and $V$ indicated on the curve. The values of $\alpha$ are given numerically while the values of $V$ are given in terms of $V_{lim}$, the latter being the non-dimensional counterflow velocity for which the concentration depth distribution is described by a straight line. The chosen values of $\alpha : \alpha = e (e \cong 27)$ and $\alpha = 4$, are estimated to cover the variations of $\alpha$ to be expected in the actual operation of a solar pond filled with suitably concentrated sea water, while the chosen values of $V$ show how the variation of the counter-flow velocity affects the shape of the concentration-depth curve as explained previously.

The rate of heat withdrawal from the container into the evaporator is equal to the rate of flow multiplied by the temperature drop in the evaporator. From the utilization point of view, the temperature drop should in most cases be as small as possible. On the other hand, the reduction of the temperature drop will be limited by economic considerations in view of the consequent increase in the rate of flow necessary for transferring the required amount of heat. An excessive temperature difference between the entry and exit end of the container should also be avoided as it is bound to affect the flow pattern of the bottom layer which may be difficult to control.

The quantity of liquid evaporated in the evaporator depends on the rate of heat withdrawal only, while the required counterflow velocity ($u$), and therefore also the quantity of liquid to be added to the top of the solution, is determined by considerations of concentration curve stability. When the required velocity is smaller than that resulting from condensing all the evaporated liquid and adding it to the top of the solution, it can be achieved by feeding part of the condensed liquid back into the bottom layer on its return from the evaporator. On the other hand, when the required velocity is greater than that made possible by the evaporation in the evaporator, the required velocity can be achieved by drawing off some solution from the circulating bottom layer. In this case, the addition of some solute may be required to keep the concentration of the bottom layer constant.

It is clear, therefore, that this method for maintaining stabilization by inducing a counterflow, can be adjusted as dictated by stability considerations without necessarily being influenced by the heat withdrawal rate. The velocity can also be made negative, if solution is added to the bottom layer. However, it should be clear that the counterflow velocity, ensuring a steady concentration curve when there exists in the solution an inverse temperature gradient, may vary in most cases only within a very limited range. The possibility for an extensive change in this velocity is therefore important only as a temporary measure for correcting harmful deviations in the planned concentration curve.

If the solution contains more than one solute, the correlation between the counterflow velocity and the steady-state distribution of the various solutes becomes much more complicated and may be quite difficult to calculate. However, it can always be determined experimentally. The counterflow velocity should be chosen so that the resulting steady-state vertical variation of the density would give maximum stability consistent with the relevent operational and economical considerations.

Since the liquid separated in the evaporator is usually valuable, it would normally not be circulated back to the top of the liquid solution. Instead, there may be added to the top additional solution which is less concentrated than the solution normally at the top. This is particularly advantageous in solar ponds where it may be desired to produce, in addition to or in lieu of power, desalinated water and/or salt. The steady state distribution in this case will be similar to that explained previously except that the concentration at all levels will now be greater by the concentration of the new solution added (Cs), provided that the total amount of solute in the solution remains constant by the continuous withdrawal, at the bottom, of the same amount of solute which is being added with the dilute solution at the top (or at any other level, as to be later described). This is achieved automatically if the concentration (Co) at the bottom is permitted to rise until it reaches saturation and the solute starts precipitating in the evaporator. In the special case when it is preferred not to let the bottom solution reach saturation, surplus solute may be removed by withdrawing small quantities of solution from the circulating bottom layer.

The foregoing features of the invention, as well as other features to be later described, may be used in a solar pond for the production of power, and/or desalinated water, and/or salt. A system for producing all three is schematically illustrated in FIG. 3.

In FIG. 3, a solar pond 20 is supplied from a source of saline or sea water 22. The pond is darkened at the bottom 24 to absorb radiations from the sun. The pond is filled with salty water such that the concentration of salts, and therefore the density of the solution, decrease from the bottom upwardly, supporting thereby an inverse temperature gradient, the temperature decreasing from the bottom toward the top.

The hot bottom layer is continuously withdrawn from one end of the pond and passes through pipe 26 into flash evaporator 28. A part of the water is evaporated there and passes, in the form of steam, through pipe 30 to a turbine 32 to drive a generator 34 and thereby to produce electric power. From turbine 32, the steam passes through pipe 36 into a condenser 38 where it condenses and exits through pipe 40 as usable distilled water, vacuum pump 41 maintaining the vacuum in condenser 38.

In condenser 38, the condensing steam is being cooled by sea water supplied from the sea 22 through pipe 42, which water then passes through pipes 44 and 46 to the top of the solar pond 20. Usable salts may be extracted from the evaporator-crystallizer 28 through pipe 48.

The water remaining in evaporator 28 following the evaporation of part of it (which remaining water is now at a lower temperature than the water introduced into the evaporator) passes through pipe 50 into a mixer 52 where it is mixed with a controlled amount of additional saline water from pipe 44. It is then passed through pipe 54 into the inlet 55 at the bottom end of the pond opposite to exit pipe 26 and at substantially the same level as the exit pipe. The controlled amount of new saline water supplied through pipe 44 is such as to obtain the required velocity of the counterflow, in accordance with the previously discussed considerations.

The mixer 52 may also be used when required for adjustment of the bottom layer concentration. Where the solution contains more than one salt (as in sea water), the mixer may also be used for controlling the bottom layer salt composition.

The withdrawal of hot solution from one end of the pond and the reintroduction of the cooled solution at the opposite end (the outlet and inlet both extending intermittently or continuously along the full width of the pond) will cause the solution in the bottom layer to flow slowly and continuously from the inlet side towards the outlet side and to thus be reheated by the solar radiations absorbed in the dark bottom. Theoretical analysis, as well as laboratory and field experiments, have shown that the required stratified flow of the bottom layer can be obtained as described without undue mixing if the values of the relevant characteristic flow parameters (the Reinolds & Fraud numbers) are kept within certain predetermined limits.

It may be desirable at certain times or in certain applications, to be discussed below, to "wash" the surface of the pond in order to reduce the salt concentration at the surface. This is provided in FIG. 3 by allowing additional quantities of the new saline water from duct 46 to flow horizontally at surface level from one end of the pond to the opposite end, where it is removed through duct 56 and returned back to the sea 22. Surface washing can also be carried out by spraying the dilute solution (e.g. new sea water) over the surface of the pond and drawing off the surplus in overflow troughs.

As in the case of the bottom layer flow it has been shown that stratified flow of a thin upper layer is also possible, and that such a flow does reduce the surface concentration. This might be desirable at certain times or in certain applications, as the difference in temperature between the hot bottom layer and the cool surface which can be allowed when the surface is washed is considerably greater than when the surface is not washed. Also, where there is a high rate of surface evaporation, particularly where sea water is used to replenish the pond rather than relatively pure water, the high rate of evaporation will cause a gradual increase in surface concentration and eventual mixing of the whole pond, which can be avoided by washing the surface to prevent the rise of surface concentration.

In some cases, it may be desirable to subject the solar pond to controlled vertical mixing of the various layers and thus also to increase the counterflow velocity necessary for maintaining the required vertical distribution. As indicated earlier, the counterflow velocity may be regulated to adapt the shape of the concentration curve to the specific requirements of the application. If it is desired that the curve be more concave, this can be quickly acomplished by temporary speeding up the counterflow velocity. But if the required shape is more convex, the rate of change depends on the rate of diffusion, and with only molecular diffusion to effect the change, its rate is going to be very slow. Speeding up the diffusion by controlled mixing will insure a more immediate response of the concentration curves shape to the control.

Controlled mixing may also be used in periods of high evaporation from the surface of the pond as an additional alternative means for preventing an excessive rise in surface concentration. This is particularly desirable when the pond is used for salt production where the reduction of surface concentration by the previously mentioned method of "surface washing" entails loss of salt and therefore loss of efficiency.

Controlled mixing is accomplished in FIG. 3 by means of air-bubbling, the air being introduced through small pipes 58 located toward the bottom of the pond. This arrangement enables mixing to be effected in a very simple, easily controlled, and inexpensive manner.

The need for effective control of the concentration distribution and quick response to corrective measures is important mainly in large ponds, where external mixing factors (winds, waves, etc.) may cause undesirable changes in the concentration curve which must be corrected without delay. Correction of the concentration curve by controlled mixing can be carried out selectively only at the specific depth where it is required.

It has also been found that the heat transfer from the bottom to the surface caused by controlled mixing is comparatively small, which is important in view of the fact that in most cases the main purpose of the system is to allow the absorption of heat in the bottom layer and minimize losses upwardly.

The correction of harmful deviations in the concentration curve can also be accomplished by controlled stratified flow of intermediate layers, so that a layer wherein the concentration of the solute is too high may be withdrawn through suitable outlets along one end of the pond and be replaced by the more dilute solution of the layer above it; while a layer wherein the concentration of solute is too low is normally displaced upwardly by the introduction, through inlets along the opposite end, of a more concentrated solution, excess solution and solute being washed away through overflow troughs. The complete replacement of a mixed upper layer may also be accomplished by this stratified flow technique, this being often required in a large pond after a storm.

The change in the concentration-depth curve resulting from the introduction and withdrawal of intermediate layers depends on their concentration, levels, the rates of flow, etc. The required adjustment of all these factors for effecting a required change in the said curve should be determined experimentally during operation, in view of the available solutions, and by observation of the gradual modification of the curve resulting from each of the various adjustments.

The possibility of controlling the shape of the concentration curve by this method has ben demonstrated in field trials.

In FIG. 3, solution may be withdrawn from any desired level by means of the horizontal perforated pipe 60 along one wall of the pond, and it can be introduced at any level by means of a similar pipe 62 along the opposite wall. The level of each of these two pipes may be adjusted by means of suitable lifting and lowering mechanisms, represented schematically in the drawings by hoists 64 and 66, respectively.

The darkened layer 24 is usually provided at the bottom of the pond by any suitable means, such as by the use of dark clay, coal dust, or other suitable darkening material. It may be desirable in some cases to make the darkened layer in the form of a floating layer constituting a false bottom of the pond. For example, two organic liquids of different densities may be mixed such that the resulting density of the mixture causes the mixture to float at a predetermined level, or the solution itself at said level may be darkened by the addition of suitably grained coal dust. The false bottom also may be made of solid dark sheets suspended at the required level.

The use of such a false bottom enables existing valleys and lakes to be converted into solar ponds.

FIG. 4 illustrates how a solar pond may thus be created. The natural depression shown in FIG. 4 is filled with salt water, the concentration of salts decreasing continuously from the bottom 80 toward the surface 82. The concentration gradient should be comparatively small between the bottom 80 and a level just below the predetermined level of the contemplated false bottom, and should be much larger from this level upwardly. The false bottom is then formed by introducing the dark floating liquid layer 84 of the appropriate density to float at the predetermined level.

Provided there is no seepage of solution through the actual bottom 80, the pond so formed can be used as a solar pond, the solar radiations being absorbed in the dark layer 84 and the heat being carried away by the circulation of the dark layer itself, or a layer of solution immediately over it. The required concentration gradient from the dark layer upwardly would be maintained in accordance with the CFS method described previously. The concentration gradient initially established in the lower section of the pond, from the false bottom 84 to the actual bottom 80, is required only for the heating up period. The continuous decrease of the temperature from the false bottom downwardly, obtained after some time, will ensure the stagnation of the lower section and thus also will minimize heat losses from the dark layer downwardly to the ground. Solution lost by seepage will have to be replenished by the addition of cold concentrated solution at the actual bottom, preferably at its lowest point.

If the false bottom is made of solid sheets suitably suspended at the required level, the initial concentration gradient in the lower section, between layer 84 and the actual bottom 80, is not required.

Besides enabling existing depressions in the land or existing lakes to be used as solar ponds, the use of the false bottom technique avoids the need for extensive levelling operations which would normally be required where a natural bottom pond is used. Moreover, a false bottom pond tends to reduce the rate of heat losses to the ground.

In constructing and using solar ponds, there is an optimum depth for which the collection efficiency is maximum. This depth depends on the radiation intensity, the operating temperature, the clarity of the solution, and other factors. Under conditions in Israel, a solar pond with average expected transmissivity would have a theoretical optimum depth, for a fully unconvective pond, varying from approximately 60 cm. for a working temperature of 20° C. above ambient to 130 cm. when the working temperature is 90° C. above ambient. (Assuming the ambient temperature to be 30° C. and the boiling temperature of the bottom solution to be 120° C., then 90° C. is the maximum possible difference in an uncovered pond.) Since, in open ponds, a thin mixed upper layer is unavoidable and so is the flowing bottom layer, the actual optimum depth will be greater, and will vary from about 90 to 200 cm.

Means could be provided for varying the depth of the pond, for example, for purposes of producing a "Tidal pond" which reduces seasonal differences in output. In this type of pond, the depth is not constant but varies continuously, increasing from spring to autumn and decreasing back again from autumn to spring, thus providing an annual tidal cycle.

The depth of the pond may be easily varied by providing overflow troughs, such as troughs 91 in FIG. 4, which can be positioned at varying heights to determine the top of the pond. Such an arrangement could of course also be provided in the systems illustrated in FIGS. 1 and 3. Alternatively, depth varying means may be provided in a false bottom type pond by changing the density of the darkened floating layer 84 so that it will float at the required level, or by changing the level of suspension, in the case of a darkened bottom in the form of suspended plates. Where a darkened floating layer is used, correcting device 88 in the system of pipes 86 and 90 for the darkened floating layer 84 may be used to change the density of the floating darkened layer.

In some types of heat utilization cycles, greater temperature drop in the evaporator may be preferred than may be allowed between the entry and the exit ends of the pond. In this case, raising the bottom layer temperature may be obtained in a number of ponds in series, so that the temperature difference between the end of any one pond is not greater than specified. Since the average bottom layer temperature is stepped up in each pond, and since the optimum depth of any pond increases with bottom temperature, the depth of the pond should also be varied accordingly.

In addition to the better control of bottom layer flow, the combined efficiency of such a series of ponds is obviously better than that of one pond with a constant depth operating at the same end temperature. The use of one pond with a sloping bottom would also appear to be possible.

Depending upon the size of the pond and the conditions under which it operates, it may be desirable to subdivide the pond by surface partitions or surface baffles, for shielding the water surface from the wind and suppressing the formation of waves. FIG. 4 illustrates surface baffles at 92. Such baffles could also be applied to the systems illustrated in FIGS. 1 and 3. The baffles should extend from about 10 cm. below the surface of the pond to about 20 cm. above it, and they should be installed perpendicularly to the direction of the prevailing winds. In large size ponds, it may be desirable to include deep baffles or partitions, such those shown at 94 in FIG. 4. Such deep partitions extend from the bottom of the pond (or from the ground where the pond has a false bottom) to a distance substantially above the top of the pond, that is, above the top of the surface baffles.

The pond should also preferably include a filtration system for filtering the solution as the pond is initially filled and for filtering the solution returned to the pond to the various ducts.

The heat energy collected by the solar pond in the form of a hot solution at a temperature which may reach 100° C. or more can be utilized for many types of industrial processes. The most important uses, however, are the production of electric power, the distillation of sea water, and the precipitation of salts from sea water or salt lakes. FIG. 3 illustrates a system in which all three are produced, primarily to demonstrate the possibility for producing each of the products and not as an indication that such simultaneous production is necessarily recommended. The optimal working conditions and the equipment most suitable for producing each of these products are different, and the economic advisability of simultaneous production of two or more products depends on many factors including local conditions.

When the main product required is distilled water, the evaporator (28 in FIG. 3 or 10 in FIG. 1) would probably be in the form of a multi-stage distillation plant, whereas if the main product is one or more salts, the evaporator would be in the form of a multi-stage crystallization plant.

One further important advantage in producing salts by the use of solar ponds, as compared to their production in evaporation pans, is that solar ponds can also be utilized in the humid zones where evaporation pans, due to excessive humidity and rainfall, are completely useless.

It has been calculated that under conditions in Israel a solar pond of 1 sq. km. may be designed and operated to produce the following annual output: $3.38 \times 10^6$ cu. meters of fresh water in a six stage distillation plant; $33 \times 10^3$ tons of sodium chloride from sea water in a one stage plant; and $38.5 \times 10^3$ tons of potassium chloride from Dead Sea water in a four stage plane. This is to be compared to the annual average output of 10,000 tons per sq. km. of sodium chloride in conventional evaporation pans for sea water, and approximately 5,000–7,000 tons of potassium chloride per sq. km. at the present Dead Sea evaporation pans.

The choice of product also affects the choice of the method for operating the pond. When the pond is utilized for the production of electric power or fresh water it would probably be necessary or desirable in most cases to include surface washing in order to prevent the rise of surface concentration due to evaporation and also to prevent undue mixing of the upper layer by wind and waves. When the pond is utilized for salt production, it would be advantageous to avoid the surface washing so that the natural evaporation from the surface of the pond is also utilized for concentrating the solution. The controlled mixing feature would probably be desirable for salt production.

It is to be understood that the described embodiments of the invention are set forth for purposes of illustration only, and that many other embodiments, variations, and applications of the invention, or the several features thereof disclosed, may be made without departing from the spirit or scope of the invention as defined in the following claims.

What is claimed is:

1. A method of maintaining a vertically varying concentration of a solute in a liquid column of a solution having a solvent and the solute, wherein the concentration of the solute is greatest at one level of the solution and decreases continuously toward a second level thereof, and wherein the resulting density of the solution decreases continuously from the lower to the upper of said two levels, characterized in inducing a vertical flow of the liquid column counter to the diffustion flux of solute for controlling the vertical distribution of the solute, said counterflow being induced by extracting from said one level solvent having a smaller concentration of solute than at said second level and adding at said second level solvent having a smaller concentration of solute than at said second level, the rates of said extraction and addition being regulated such as to maintain said vertically varying concentration while avoiding excessive mixing tending to destroy same.

2. The method according to claim 1, wherein the concentration of the solute also decreases continuously from the lower to the upper of said two levels.

3. The method according to claim 2, further including the step of heating said lower level of the liquid column to produce a vertically varying temperature which decreases continuously from said lower to said upper level, said vertically varying concentration being sufficient to maintain a substantially stable vertically density continuously decreasing from said lower level to said upper level, thus preventing convection currents and maintaining said vertically varying temperature.

4. A method of maintaining an inverse temperature gradient between an upper and a lower level in a solar pond of saline water, the solar pond having a dark layer to absorb radiations from the sun applied thereto through the upper level thereof, comprising maintaining a vertically varying concentration of the salt in the solar pond sufficient to support said inverse temperature gradient by inducing a downward flow of the saline water counter to the diffusion flux of the salt for controlling the vertical distribution of the salt, said counterflow being induced by extracting from said lower level water having a smaller concentration of salt than at said upper level and adding at said upper level water having a smaller concentration of salt than at said upper level, the rates of said extraction and addition being regulated such as to maintain said vertically varying concentration while avoiding excessive mixing tending to destroy same, said vertically varying concentration being sufficient to maintain a substantially stable vertically varying density continuously decreasing from said lower level to said upper level, thus preventing convection currents and maintaining said inverse temperature gradient.

5. The method according to claim 4, further including the steps of washing said upper level of the pond by additional quantities of water having a smaller concentration of salt than at said upper level, said additional quantities of water being passed horizontally across the upper level of the pond, thereby reducing the salt concentration at said upper level and also enabling the establishment of a larger temperature gradient between said upper level and said lower level.

6. The method according to claim 4, further including the step of subjecting the solar pond to controlled vertical mixing of the various layers, to increase the counterflow velocity necessary for maintaining the required vertical distribution of solute which allows, in certain cases, a more effective control of the said distribution and a quicker response to corrective measures.

7. The method according to claim 4, further including the steps of utilizing stratified flow to correct deviations in said vertically varying concentration by adding and withdrawing saline water of the appropriate concentrations and at the appropriate levels between said upper and lower levels.

8. The method according to claim 4, wherein usable heat is extracted from said lower level of the solar pond.

9. The method according to claim 8, wherein said heat is used to produce steam for driving low pressure turbogenerators.

10. The method according to claim 8 wherein said heat is used to produce steam, which in turn is used to produce desalinated water.

11. The method according to claim 4, wherein usable salt is extracted from said lower level of the solar pond by withdrawing hot saline water from said lower level and evaporating water, thereby precipitating salt therefrom.

12. The method according to claim 4, wherein said darkened layer is at the bottom of the pond.

13. The method according to claim 4, wherein said darkened layer is a floating layer constituting a false bottom of the pond.

14. A system for maintaining a vertically varying concentration of a solute in a liquid column of a solution having a solvent and the solute, wherein the concentration of the solute is greatest at one level of the solution and decreases continuously toward a second level thereof, and wherein the resulting density of the solution decreases continuously from the lower to the upper of said two levels, characterized in the provision of means for inducing a vertical flow of the liquid column counter to the diffusion flux of solute for controlling the vertical distribution of the solute, said counterflow inducing means comprising means for extracting from said one level solvent having a smaller concentration of solute than at said second level and means for adding at said second level solvent having a smaller concentration of solute than at said second level, said extracting and adding means operating at such rates so as to maintain said vertically varying concentration while avoiding excessive mixing tending to destroy same.

15. A system for maintaining an inverse temperature gradient between an upper and a lower level in a solar pond of saline water, the solar pond having a dark layer to absorb radiations from the sun applied thereto through the upper level thereof, comprising means for maintaining a vertically varying concentration of the salt in the solar pond sufficient to support said inverse temperature gradient by inducing a downward flow of the saline water counter to the diffusion flux of the salt for controlling the vertical distribution of the salt, said counterflow inducing means including means for extracting from said lower level water having a smaller concentration of salt than at said upper level, and means for adding at said upper level water having a smaller concentration of salt than at said upper level, said extracting and adding means operating at such rates so as to maintain said vertically varying concentration while avoiding excessive mixing tending to destroy same, said vertically varying concentration being sufficient to maintain a substantially stable vertically varying density continuously decreasing from said lower level to said upper level, thus preventing convection currents and maintaining said inverse temperature gradient.

16. The system according to claim 15, wherein the dark layer of the solar pond is at a depth of 90–200 cm from the top of the pond.

17. The system according to claim 15, wherein means are provided for varying the depth of the pond.

18. The system accoording to claim 15, further including baffles applied to the upper surface of the solar pond for suppressing the formation of waves.

References Cited

FOREIGN PATENTS 236,337  11/1961  Australia.

CHARLES J. MYHRE, *Primary Examiner.*